United States Patent
Livingston et al.

(10) Patent No.: US 7,668,426 B2
(45) Date of Patent: Feb. 23, 2010

(54) FIBER OPTIC CABLE ASSEMBLY WITH INTEGRATED COMPRESSING MEMBER FOR STRAIN RELIEF

(75) Inventors: Joseph C. Livingston, Frisco, TX (US); Timothy W. Anderson, Omaha, NE (US); Richard L. Case, Omaha, NE (US); Wade J. Womack, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 129 days.

(21) Appl. No.: 11/735,585

(22) Filed: Apr. 16, 2007

(65) Prior Publication Data
US 2007/0280621 A1 Dec. 6, 2007

Related U.S. Application Data

(60) Provisional application No. 60/794,902, filed on Apr. 25, 2006.

(51) Int. Cl.
*G02B 6/44* (2006.01)
*G02B 6/00* (2006.01)
(52) U.S. Cl. ................... 385/102; 385/106; 385/139
(58) Field of Classification Search ......... 385/100–114, 385/139
See application file for complete search history.

(56) References Cited

U.S. PATENT DOCUMENTS 5,416,874 A   5/1995  Giebel et al.
5,657,413 A   8/1997  Ray et al.
6,326,550 B1  12/2001 Dyer et al.
7,149,392 B2 * 12/2006 Chen et al. ............ 385/100
2005/0098345 A1  5/2005  Nichaus et al.
2006/0045429 A1  3/2006  Chen et al.
2007/0212005 A1 * 9/2007  Lu et al. ................ 385/100

FOREIGN PATENT DOCUMENTS

EP    1 361 465 A1   11/2003
FR    2 858 066 A1   7/2003

OTHER PUBLICATIONS

International Search Report for PCT/US2007/009868.

* cited by examiner

*Primary Examiner*—Kevin S Wood
(74) *Attorney, Agent, or Firm*—Myers Bigel Sibley and Sajovec

(57) ABSTRACT

A pre-terminated cable assembly includes: a fiber optic cable comprising a plurality of optical fibers surrounded by a polymeric jacket; the jacket including a transition region, wherein the plurality of optical fibers is broken out into fiber subunits on one side of the transition region; a sleeve fixed to the transition region; and a circumferentially compressing member mounted on the transition region of the jacket adjacent the fixing sleeve. In this configuration, the cable assembly can have sufficient strain relief and protection for the optical fibers as the cable is manipulated into place during installation.

29 Claims, 4 Drawing Sheets

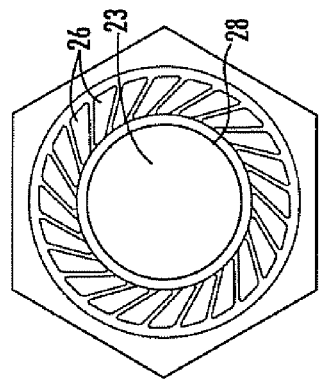
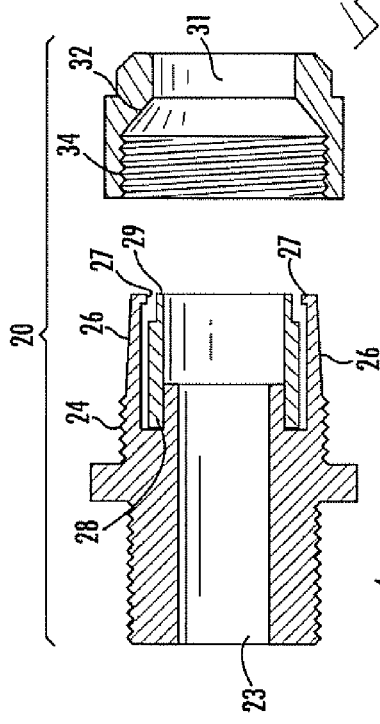
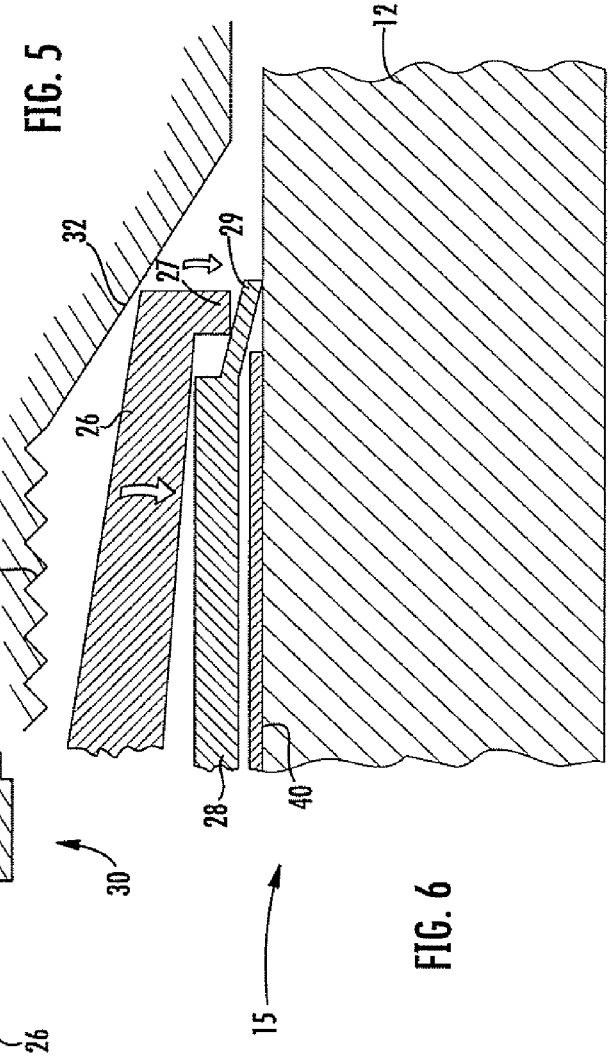

FIBER OPTIC CABLE ASSEMBLY WITH INTEGRATED COMPRESSING MEMBER FOR STRAIN RELIEF

RELATED APPLICATION

This application claims priority from U.S. Provisional Patent Application Ser. No. 60/794,902, filed Apr. 25, 2006, entitled FIBER OPTIC CABLE ASSEMBLY WITH INTEGRATED CABLE GLAND AND PULLING EYE/SOCK, the disclosure of which is hereby incorporated herein in its entirety.

FIELD OF THE INVENTION

The present invention relates to communications cabling and, more particularly, to connectorized fiber optic cabling and methods for forming the same.

BACKGROUND OF THE INVENTION

Pre-terminated optical fiber cable assemblies typically have a fixed transition region between the cordage (i.e., the portion of the cable surrounded by the jacket) and furcated fibers or ribbons, which are subsequently connectorized. A pulling eye/sock can be used to assist in pulling the cable through ductwork and the like. The pulling eye/sock includes a looped eyelet on one end to receive a finger, hook or other grasping device and a "sock" or sleeve that is secured to the jacket of the cable via a "heat shrink" material or a solid epoxy transition component; the sock covers the furcated fibers. This arrangement can protect the fibers and their connectors. At installation, different off-the-shelf components, such as cable ties, can be used to provide strain relief for the mated connectors from disturbance of the cable.

A loose tube optical fiber cable has been developed that has a plurality of loose, non-buffered optical fibers, a strength yarn at least partially surrounding the non-buffered optical fibers, and a jacket surrounding the strength yarn and the non-buffered optical fibers. See U.S. Patent Application Ser. No. 60/688,493, filed Jun. 8, 2005, the disclosure of which is hereby incorporated herein in its entirety. One of the advantages of this cable is that there is no preferential bend direction. Additionally, a direct multi-fiber connector termination method for the loose tube cable has been developed (see U.S. patent application Ser. No. 11/438,647, now patented as U.S. Pat. No. 7,537,393) that allows for end to end termination of the loose tube cable without using a solid epoxy transition component to separate individual fibers and subunits, it would be desirable to provide an arrangement that protects the broken out fiber subunits and connectors of this cable during installation.

SUMMARY OF THE INVENTION

As a first aspect, embodiments of the present invention are directed to a pre-terminated cable assembly, comprising a fiber optic cable comprising a plurality of optical fibers surrounded by a polymeric jacket; the jacket including a transition portion, wherein the plurality of optical fibers is broken out into subunits on one side of the transition portion; a fixing sleeve fixed to the transition portion; and a circumferentially compressing member mounted on the transition portion of the jacket adjacent the fixing sleeve. In this configuration, the cable assembly can have sufficient strain relief and protection for the optical fibers as the cable is manipulated into place during installation.

As a second aspect, embodiments of the present invention are directed to a pre-terminated cable assembly, comprising: a fiber optic cable comprising a plurality of optical fibers surrounded by a polymeric jacket; a fixing sleeve fixed to the jacket; and a circumferentially compressing member mounted on the jacket adjacent the fixing sleeve.

In some embodiments, the compressing member is a cable gland. In other embodiments, the assembly is covered by a sock that facilitates pulling of the cable through ductwork and the like.

As a third aspect, embodiments of the present invention are directed to a method of relieving strain on a pre-terminated fiber optic cable. The method comprises: (a) providing a fiber optic cable comprising: a plurality of optical fibers surrounded by a generally round polymeric jacket; a fixing sleeve fixed to the jacket; and a circumferentially compressing member inserted onto the jacket adjacent the fixing sleeve; and (b) fixing the compressing member to the jacket adjacent the fixing sleeve to provide strain relief to the optical fibers.

BRIEF DESCRIPTION OF THE FIGURES

FIG. 4 is an exploded section view of the cable gland shown in FIG. 3.

FIG. 5 is an end view of the fitting of the cable gland of FIG. 4.

FIG. 6 is a greatly enlarged section view of the cable gland, cable and heat shrink sleeve of the cable assembly of FIG. 1 showing the cable clamped by the cable gland.

DETAILED DESCRIPTION OF EMBODIMENTS OF THE INVENTION

Figure 1:
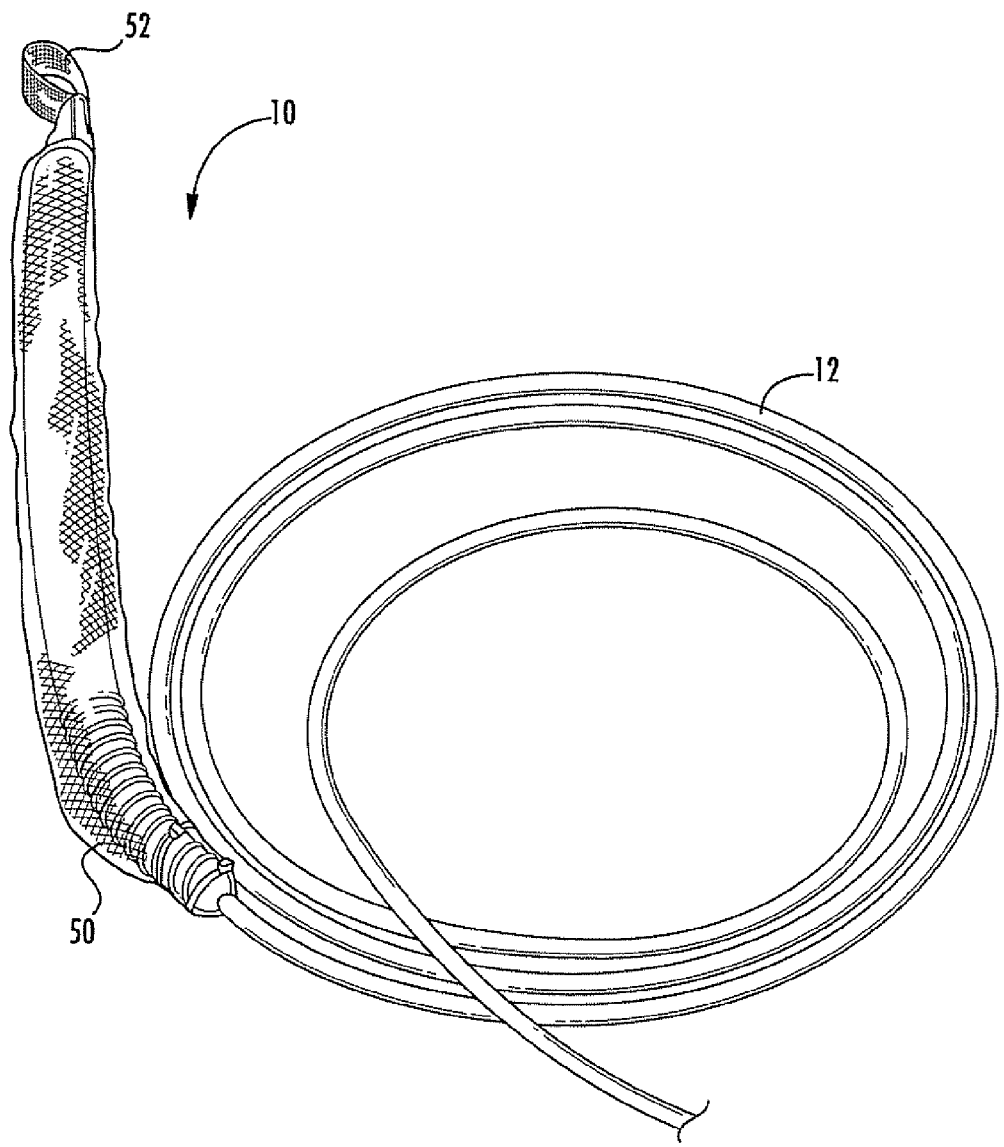
FIG. 1 is a perspective view of a cable assembly according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Figure 2:
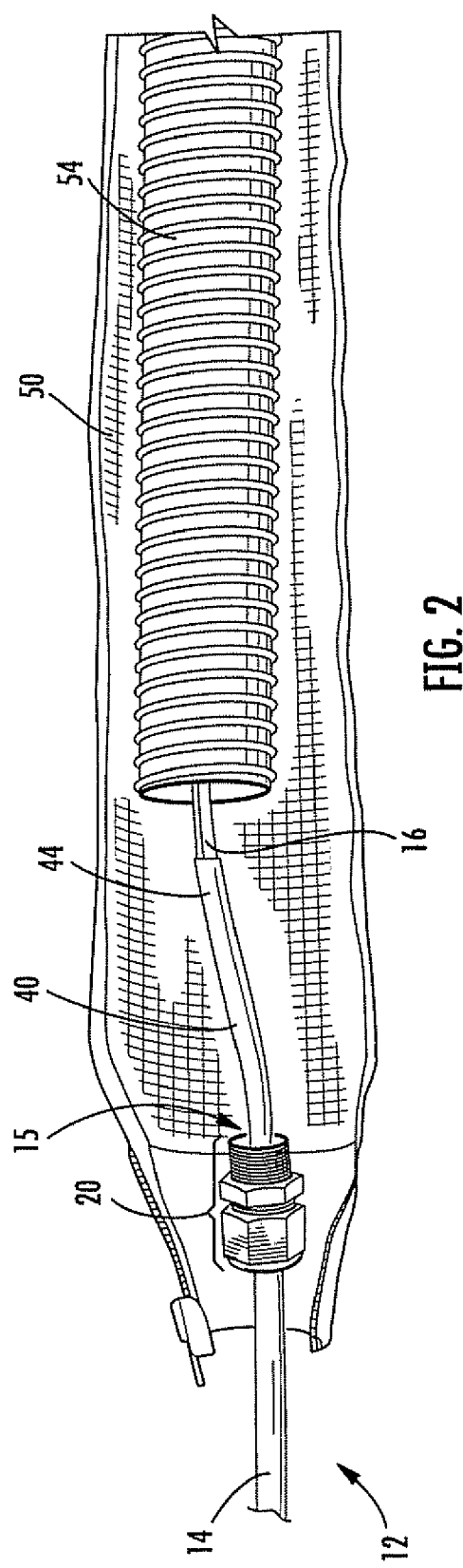
FIG. 2 is a section view of the cable assembly of FIG. 1.
Figure 3:
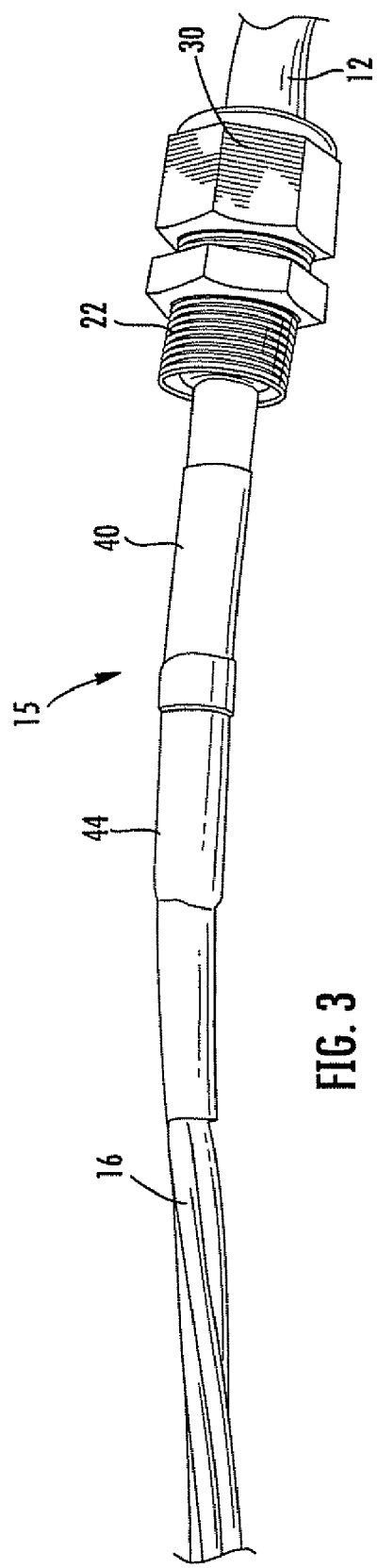
FIG. 3 is an enlarged side view of the cable, cable gland and heat shrink sleeves of the cable assembly of FIG. 1 with the cable gland moved away from the heat shrink sleeves.

Turning now to the figures, a fiber optic cable assembly, designated broadly at 10, is illustrated in FIGS. 1-3. The cable assembly 10 includes a fiber optic cable 12, a cable gland 20, two heat shrink sleeves 40, 44, and a protective sock 50. These components are described in greater detail below.

Referring now to FIGS. 2 and 3, the fiber optic cable 12 includes a plurality of cable subunits 16, each of which has one or more optical fibers enclosed in a protective jacket. The subunits 16 are then enclosed in a protective outer jacket 14 that is typically formed of a polymeric material. An exemplary cable is described in U.S. Provisional Patent Application Ser. No. 60/688,493, filed Jun. 8, 2005, the disclosure of which is hereby incorporated herein in its entirety. The cable subunits 16 are freed, or "broken out," from the jacket 14 at a transition region 15 of the cable 12 in order to facilitate their interconnection with other or other optical devices or components. Typically, the cable subunits 16 are terminated with connectors, such as an MPO connector, that enables each cable subunit 16 to be optically connected with a mating connector.

Turning to FIGS. 4 and 5, the cable gland 20 comprises a fitting 22 and a clamping nut 30. The fitting 22 has a central bore 23 and external threads 24 that receive the clamping nut 30. At one end of the fitting 22, a plurality of projections 26 extend axially; together, the projections 26, which are somewhat wedge-shaped in cross-section (see FIG. 5), define a circle around the bore 23. Each of the projections 26 has a nub 27 that extends radially inwardly. The fitting 22 also has a cylindrical sealing sleeve 28 formed of a flexible material that fits within the bore 23 radially inwardly of the projections 26. The sealing sleeve 28 has a recessed end 29 that is positioned radially inwardly of the nubs 27.

The clamping nut 30 includes a central bore 31 and internal threads 34 that are received in the threads 24 of the fitting 22. The clamping nut 30 also includes a beveled bearing surface 32 adjacent the threads 34.

Together, the fining 22 and the clamping nut 30 can grasp the cable 12 as it is inserted into the bore 23 of the fitting 22 and the bore 31 of the clamping nut 30. As the clamping nut 30 is tightened onto the threads 24 of the fitting 22, the beveled bearing surface 32 bears upon the projections 26 of the fitting 22, which forces them to deflect radially inwardly. As the nubs 27 of the projections 26 contact the sealing sleeve 28, they force its recessed end 29 radially inwardly and into contact with the cable jacket 14 (see FIG. 6). Increased tightening of the clamping nut 30 onto the fitting 22 in turn tightens the grip of the recessed end of the sealing sleeve 28 onto the cable jacket 14. The sealing sleeve 28 eventually forms a lip in contact with the cable jacket 14. As can be seen in FIG. 2, the cable gland 20 is mounted on the transition region 15 of the cable 12 (in FIG. 3, the cable gland 20 has been moved away from the transition region 15 for clarity in illustrating other components, but would ordinarily be mounted on the transition region 15).

Exemplary cable glands suitable for use with this invention are available from Hummel Elektrotechnik GmbH, Heyco Products, Inc. (Toms River, N.J.), and Sealcon, Inc. (Centennial, Colo.).

Turning back to FIG. 3 and referring also to FIG. 6, the heat shrink sleeve 40 circumferentially surrounds the transition region 15 of the cable 12 within the bore 23 of the fitting 22 and extends longitudinally therefrom away from the cable gland 20. The heat shrink sleeve 40 is adhered to the cable jacket 14 via an adhesive layer (not shown). At one end, the heat shrink sleeve 40 abuts the lip formed by the sealing sleeve 28 of the cable gland 20. The heat shrink sleeve 40 can be formed of any suitable heat-shrinkable material, such as a polyolefin, and the adhesive can be any adhesive that is typically employed with polyolefin materials.

The combination of the cable gland 20 and the heat shrink sleeve 40 can provide a significant cable retention and strain relief mechanism to the cable 12. The cable gland 20 and the heat shrink sleeve 40 can form a unified structure that is fixed tightly to the cable 12 and can combine with a strength member (not shown) within the cable 12 to provide enhanced cord gripping/cable retention along with strain relief protection to the cable 12. Such cord gripping and strain relief can be important as the cable 12 is threaded through ducts and the like during installation and once the cable 12 is installed. The increased cable retention from the assembly can withstand the higher axial forces in the cable that may be experienced during a normal cable installation poll.

Referring still to FIG. 3, the heat shrink sleeve 44 circumferentially surrounds the cable jacket 14 and/or the cable subunits 16 adjacent the heat shrink sleeve 40. In some embodiments, as illustrated in FIG. 2, the heat shrink sleeve 40 overlaps the heat shrink sleeve 44 at their common end portions. Also, in the illustrated embodiment the heat shrink sleeve 44 covers the jacket 14 and the portion cable subunits 16 adjacent the end of the jacket 14 (i.e., where the jacket 14 has been stripped from the cable 12). The heat shrink sleeve 44, which can be formed of the same materials as those listed above for the heat shrink sleeve 40, is typically shrunk onto the cable jacket 14 without adhesive, but may include adhesive in some embodiments.

Referring now to FIG. 2, the sock 50 covers the cable gland 20, the heat shrink sleeves 40, 44 and the cable subunits 16 as they extend away from the sleeves 40, 44. The sock 50, which may include a zipper to allow access to the component therein, is held in place adjacent and engaging the cable gland 20 with one or more plastic ties (see FIG. 1) or other fastening component. An exemplary sock is available from Zippertubing, Inc., Los Angeles, Calif. A flexible protective tube 54 (e.g. a corrugated tube available from Carlon, Inc., Cleveland, Ohio) covers the cable subunits 16 within the sock 50.

The sock 50 includes a loop or eye 52 at the end away from the cable gland 20 to facilitate the installation of the cable 12 by providing an installer with a feature that can be easily grasped (e.g., with a hook and line or the like) to draw the cable 12 through ducts or other structures. Pulling on the sock 50 transmits the pulling force to the cable gland 20, which can then distribute the force to the cable jacket 14 and any strength members contained therein and to the heat shrink sleeve 40 and cable gland 20.

Those skilled in this art will appreciate that the cable assembly 10 may take other forms. For example, the cable gland may take other forms, or another circumferential compressing member, such as a wedge type compression gland fitting, may be employed. The sleeves 40, 44 may be formed of other materials, including some that are not applied via a heat shrinking process, that allow the sleeves to be fixed to the cable jacket and to provide an engagement location for the cable gland 20. The sock 50 may be formed in a different configuration; for example, it may lack a loop or eye, or a zipper. The tube 54 may also take a different configuration or be omitted entirely.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention.

That which is claimed is:

1. A pre-terminated cable assembly, comprising:
   a fiber optic cable comprising a plurality of optical fibers surrounded by a generally round polymeric jacket;
   the jacket including a transition region, wherein the plurality of optical fibers is broken out into subunits on one side of the transition region;
   a sleeve fixed to the transition region; and
   a circumferentially compressing member mounted on the transition region of the jacket adjacent and overlying the sleeve, the compressing member compressing the sleeve, wherein a compressed portion of the compressing member abuts an end of the sleeve.

2. The cable assembly defined in claim 1, further comprising a protective sock that engages the compressing member and covers the transition region and the broken-out fiber subunits.

3. The cable assembly defined in claim 2, wherein the protective sock includes a zipper.

4. The cable assembly defined in claim 2, wherein one end of the protective sock engages the compressing member, and wherein the protective sock further comprises a loop at an opposite end.

5. The cable assembly defined in claim 1, wherein the sleeve comprises a heat-shrinkable material.

6. The cable assembly defined in claim 1, wherein the compressing member is configured for releasable and repeatable mounting on the jacket.

7. The cable assembly defined in claim 1, wherein the compressing member is a cable gland.

8. The cable assembly defined in claim 1, wherein the plurality of optical fibers is subdivided into a plurality of cable subunits, each of the subunits having a plurality of optical fibers.

9. The cable assembly defined in claim 1, wherein the polymeric jacket is generally round in cross-section.

10. The cable assembly defined in claim 2, further comprising a protective tube that covers the broken out fiber subunits and resides inside of the protective sock.

11. The cable assembly defined in claim 1, wherein each of the optical fibers is terminated with a connector.

12. A pre-terminated cable assembly, comprising:
    a fiber optic cable comprising a plurality of optical fibers surrounded by a polymeric jacket;
    a sleeve fixed to the jacket; and
    a circumferentially compressing member mounted on the jacket adjacent and overlying the sleeve, the compressing member compressing the sleeve,
    wherein the compressing member comprises a cable gland.

13. The cable assembly defined in claim 12, further comprising a protective sock that engages the compressing member and covers the optical fibers, which are broken out into fiber subunits.

14. The cable assembly defined in claim 13, wherein the protective sock includes a zipper.

15. The cable assembly defined in claim 13, wherein one end of the protective sock engages the compressing member, and wherein the protective sock further comprises a loop at an opposite end.

16. The cable assembly defined in claim 12, wherein a compressed portion of the compressing member abuts an end of the sleeve.

17. The cable assembly defined in claim 12, wherein the sleeve comprises a heat-shrinkable material.

18. The cable assembly defined in claim 12, wherein the compressing member is configured for releasable and repeatable mounting on the jacket.

19. The cable assembly defined in claim 12, wherein the plurality of optical fibers is subdivided into a plurality of cable subunits, each of the subunits having a plurality of optical fibers.

20. The cable assembly defined in claim 12, wherein the polymeric jacket is generally round in cross-section.

21. The cable assembly defined in claim 13, further comprising a protective tube that covers the broken out fiber subunits and resides inside of the protective sock.

22. A method of relieving strain and/or improving cable retention on a pre-terminated fiber optic cable, comprising:
    (a) providing a fiber optic cable comprising:
        a plurality of optical fibers surrounded by a polymeric jacket;
        a sleeve fixed to the jacket; and
        a cable gland inserted onto the jacket adjacent the sleeve; and
    (b) fixing the cable gland to the jacket adjacent and overlying the sleeve, the cable gland compressing the sleeve.

23. The method defined in claim 22, further comprising inserting the cable, sleeve and cable gland into a protective sock.

24. The method defined in claim 23, further comprising inserting the cable and sleeve into a protective tube and inserting the protective tube into the protective sock.

25. The method defined in claim 22, comprising stripping the cable jacket to a point adjacent the sleeve.

26. The method defined in claim 22, wherein each of the optical fibers is terminated with a connector.

27. The method defined in claim 22, wherein the plurality of optical fibers is subdivided into a plurality of cable subunits, each of the subunits including a plurality of optical fibers.

28. The method defined in claim 22, wherein the cable gland is configured to provide strain relief.

29. A pre-terminated cable assembly, comprising:
    a fiber optic cable comprising a plurality of optical fibers surrounded by a generally round polymeric jacket;
    the jacket including a transition region, wherein the plurality of optical fibers is broken out into subunits on one side of the transition region;
    a sleeve fixed to the transition region; and
    a circumferentially compressing member mounted on the transition region of the jacket in contact with the sleeve, the compressing member compressing the sleeve, the compressing member comprising a cable gland having a fitting that overlies the sleeve and a nut that compresses the fitting onto the sleeve.

* * * * *